(12) United States Patent
Hoshi (10) Patent No.: US 8,674,561 B2
(45) Date of Patent: *Mar. 18, 2014

(54) MULTI-HEAD LINEAR MOTOR WITH CORES

(75) Inventor: Toshiyuki Hoshi, Fukuoka (JP)

(73) Assignee: Kabushiki Kaisha Yaskawa Denki, Kitakyushu-Shi (JP)

(*) Notice: Subject to any disclaimer, the term of this patent is extended or adjusted under 35 U.S.C. 154(b) by 112 days.

This patent is subject to a terminal disclaimer.

(21) Appl. No.: 13/230,991

(22) Filed: Sep. 13, 2011

(65) Prior Publication Data

US 2012/0062046 A1 Mar. 15, 2012

(30) Foreign Application Priority Data

Sep. 13, 2010 (JP) ................................. 2010-204266

(51) Int. Cl.
*H02K 41/03* (2006.01)
(52) U.S. Cl.
USPC ......................................... 310/12.15; 310/13
(58) Field of Classification Search
USPC ............... 310/12.15, 22, 27, 33, 12.01–12.33
See application file for complete search history.

(56) References Cited

U.S. PATENT DOCUMENTS

2004/0212255 A1* 10/2004 Yung-Tsai et al. ............... 310/12

FOREIGN PATENT DOCUMENTS

| JP | 2001-211630 | 8/2001 | |
| JP | 2001211630 A * | 8/2001 | ............. H02K 41/02 |

* cited by examiner

*Primary Examiner* — Tran Nguyen
*Assistant Examiner* — Leda Pham
(74) *Attorney, Agent, or Firm* — Ditthavong Mori & Steiner, P.C.

(57) ABSTRACT

A multi-head linear motor with cores according to an embodiment includes a permanent magnet field and an armature. The permanent magnet field includes P pieces of permanent magnets. The armature is arranged so as to face the permanent magnet field through a magnetic air gap and includes M pieces of armature coils. Any one of the armature and the permanent magnet field constitutes a mover, the other constitutes a stator, and the mover is arranged in plurality to be lined up over a single piece of the stator to individually drive the movers relative to the stator. Moreover, the movers each include a large thrust mover and a small thrust mover that have different relationships each determined with a magnetic pole number P of the permanent magnets and a number M of the armature coils relative to the stator.

7 Claims, 7 Drawing Sheets

FIG.4A $5\tau p \times N$
(N: 1, 2, 3···)

$4\tau p \times N$
(N: 1, 2, 3···)

※ POLE PITCH= $\tau p$ (ELECTRICAL ANGLE 180°)

|  | FIRST EMBODIMENT | | SECOND EMBODIMENT | | THIRD EMBODIMENT | |
|---|---|---|---|---|---|---|
|  | LARGE THRUST MOVER | SMALL THRUST MOVER | LARGE THRUST MOVER | SMALL THRUST MOVER | LARGE THRUST MOVER | SMALL THRUST MOVER |
| MOVER LENGTH | $8\tau_p \times 1$ | $5\tau_p$ | $8\tau_p \times 1$ | $4\tau_p$ | $8\tau_p \times 1$ | $2\tau_p$ |
| COIL NUMBER/PHASE | 100% | 67% | 100% | 33% | 100% | 33% |
| WINDING FACTOR | 100% | 99% | 100% | 92% | 100% | 92% |
| GAP MAGNETIC FLUX DENSITY | 100% | 100% | 100% | 98% | 100% | 102% |
| TURN NUMBER *1 | 100% | 92% | 100% | 159% | 100% | 64% |
| INDUCED VOLTAGE *1 | 100% | 61% | 100% | 48% | 100% | 20% |
| WINDING RESISTANCE *1 | 100% | 61% | 100% | 57% | 100% | 20% |
| MOTOR CONSTANT | 100% | 78% | 100% | 63% | 100% | 44% |
| MAXIMUM THRUST | 100% | 61% | 100% | 39% | 100% | 20% |

|  | FOURTH EMBODIMENT | | FIFTH EMBODIMENT | | SIXTH EMBODIMENT | |
|---|---|---|---|---|---|---|
|  | LARGE THRUST MOVER | SMALL THRUST MOVER | LARGE THRUST MOVER | SMALL THRUST MOVER | LARGE THRUST MOVER | SMALL THRUST MOVER |
| MOVER LENGTH | $5\tau_p \times 1$ | $4\tau_p$ | $5\tau_p \times 1$ | $2\tau_p$ | $4\tau_p \times 1$ | $2\tau_p$ |
| COIL NUMBER/PHASE | 100% | 50% | 100% | 50% | 100% | 100% |
| WINDING FACTOR | 100% | 93% | 100% | 93% | 100% | 100% |
| GAP MAGNETIC FLUX DENSITY | 100% | 98% | 100% | 102% | 100% | 104% |
| TURN NUMBER *1 | 100% | 172% | 100% | 70% | 100% | 41% |
| INDUCED VOLTAGE *1 | 100% | 78% | 100% | 33% | 100% | 42% |
| WINDING RESISTANCE *1 | 100% | 94% | 100% | 33% | 100% | 35% |
| MOTOR CONSTANT | 100% | 80% | 100% | 57% | 100% | 71% |
| MAXIMUM THRUST | 100% | 64% | 100% | 32% | 100% | 50% |

※ EACH EMBODIMENT INDICATES VALUES WHEN MOTOR CHARACTERISTICS OF LARGE THRUST MOVER ARE ASSUMED TO BE 100.
*1 IN EACH EMBODIMENT, COILS USED FOR LARGE/SMALL THRUST MOVERS HAVE THE SAME CONDUCTOR DIAMETER AND ARE PARALLEL WIRINGS WHEN COIL NUMBER OF EACH PHASE IS PLURAL.

US 8,674,561 B2

MULTI-HEAD LINEAR MOTOR WITH CORES

CROSS-REFERENCE TO RELATED APPLICATION

This application is based upon and claims the benefit of priority of the prior Japanese Patent Application No. 2010-204266, filed on Sep. 13, 2010, the entire contents of which are incorporated herein by reference.

FIELD

The embodiments discussed herein are directed to a multi-head linear motor with cores.

BACKGROUND

Multi-head linear motors have been developed that can individually drive a plurality of movers by arranging the movers having the same size above a single stator as linear motors used for, for example, feeders mounted on semiconductor manufacturing equipment, electronic component mounting equipment, or tables of machine tools or the like. Such multi-head linear motors relate to a technique disclosed in Japanese Patent Application Laid-open No. 2001-211630.

In such multi-head linear motors, a mover constituting an armature includes a mover base and a plurality of armature coils collectively wound around an armature core and being in three-phase connection. On the other hand, a stator constituting a field is arranged so as to face the armature through a magnetic air gap and is constituted of a field yoke and a plurality of permanent magnets provided in the longitudinal direction of the field yoke, that is, in the so-called linear direction so as to alternately have different magnetic poles. A multi-head linear motor with cores having such a structure in which a plurality of movers having the same build are arranged above a single stator can move individual works mounted on the movers.

The structure of the mover for the multi-head linear motor with cores is described in detail below. For example, a structure in which a relationship basically determined with a magnetic pole number P of permanent magnet fields and an armature coil number M is a combination of P=2 and M=3 is developed as one set. In this case, the lengths of the movers having the same combination can be determined so as to correspond to works requiring different necessary thrusts by constituting the movers with one set composed of a small thrust mover and two sets composed of a large thrust mover whose length corresponds to the length of two of the small thrust movers. Thus, in the multi-head linear motor, a combination of minimum units of the magnetic pole number and the coil number is determined as one set, and the set number of the movers is changed depending on a necessary thrust for each of the movers to deal with the works.

However, a motor build may be unnecessarily enlarged with an arrangement of movers of a conventional linear motor when necessary thrusts for the movers largely differ from one another, for example, the large thrust mover has 1000 newtons and the small thrust mover has 100 newtons.

SUMMARY

A multi-head linear motor with cores according to an aspect of the embodiment includes a permanent magnet field and an armature. The permanent magnet field includes P pieces of permanent magnets arrayed in a linear direction so as to alternately have different magnetic poles. The armature is arranged so as to face the permanent magnet field through a magnetic air gap and includes M pieces of armature coils collectively wound around an armature core and being in three-phase connection. Any one of the armature and the permanent magnet field constitutes a mover, the other constitutes a stator, and the mover is arranged in plurality to be lined up over a single piece of the stator, and the movers are individually driven relative to the stator, and the movers each include a large thrust mover and a small thrust mover that have different relationships each determined with a magnetic pole number P of the permanent magnets and a number M of the armature coils relative to the stator.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

A first embodiment will be described below.

Figure 1A:
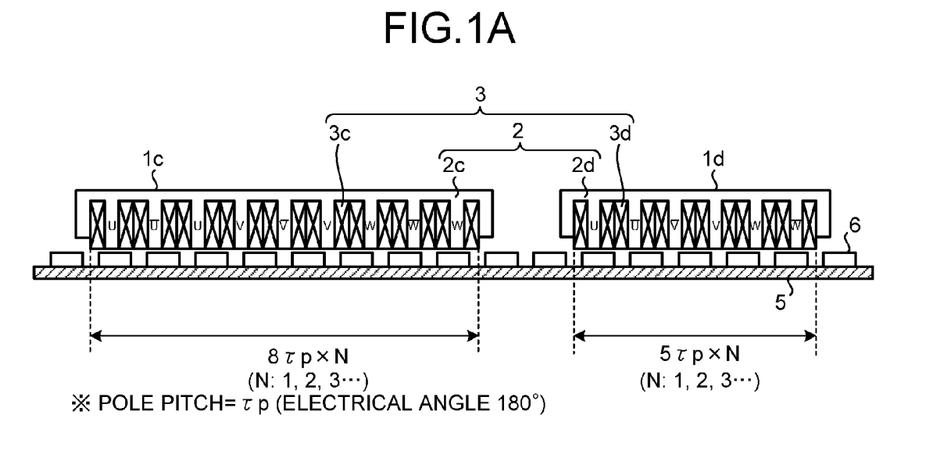
FIG. 1A is a side view of a multi-head linear motor with cores according to a first embodiment.
Figure 1B:
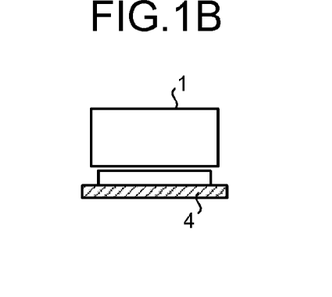
FIG. 1B is an elevation view of the multi-head linear motor with cores illustrated in FIG. 1A.

FIG. 1A is a side view of a multi-head linear motor with cores according to the first embodiment. FIG. 1B is an elevation view of the multi-head linear motor with cores illustrated in FIG. 1A.

In FIGS. 1A and 1B, 1 denotes a mover, 1c denotes a large thrust mover, 1d denotes a small thrust mover, 2 denotes armature cores, 2c denotes a large thrust core, 2d denotes a small thrust core, 3 denotes an armature coil, 3c denotes a large thrust coil, 3d denotes a small thrust coil, 4 denotes a stator, 5 denotes a field yoke, and 6 denotes a permanent magnet.

In the linear motor according to the first embodiment, the mover 1 constitutes an armature including a plurality of armature coils 3 collectively wound around the armature cores 2 and being in three-phase connection. On the other hand, the stator 4 is arranged so as to face the armature through a magnetic air gap and that constitutes permanent magnet fields including a plurality of permanent magnets 6 alternately having different magnetic poles in the longitudinal direction of the field yoke 5, that is, in the so-called linear direction. Particularly, such a structure is characterized in that the mover 1 constituted of more than one such large thrust movers 1c and small thrust movers 1d that have each different relationship (combination) determined with a magnetic pole number P of the permanent magnet fields constituting the stator 4 and a coil number M of the armature constituting the mover 1 is arranged on a single piece of the stator 4.

Specifically, in FIGS. 1A and 1B, the large thrust mover 1c has a combination of the magnetic pole number of the permanent magnet fields P=8 and the armature coil number M=9, and the length of the mover is 8τp×N (N: 1, 2, 3, and so on) when the pole pitch is indicated by τp. In contrast, the small thrust mover 1d has a combination of the magnetic pole number of the permanent magnet fields P=5 and the armature coil number M=6, and the length of the mover is 5τp×N (N: 1, 2, 3, and so on).

Figure 7:
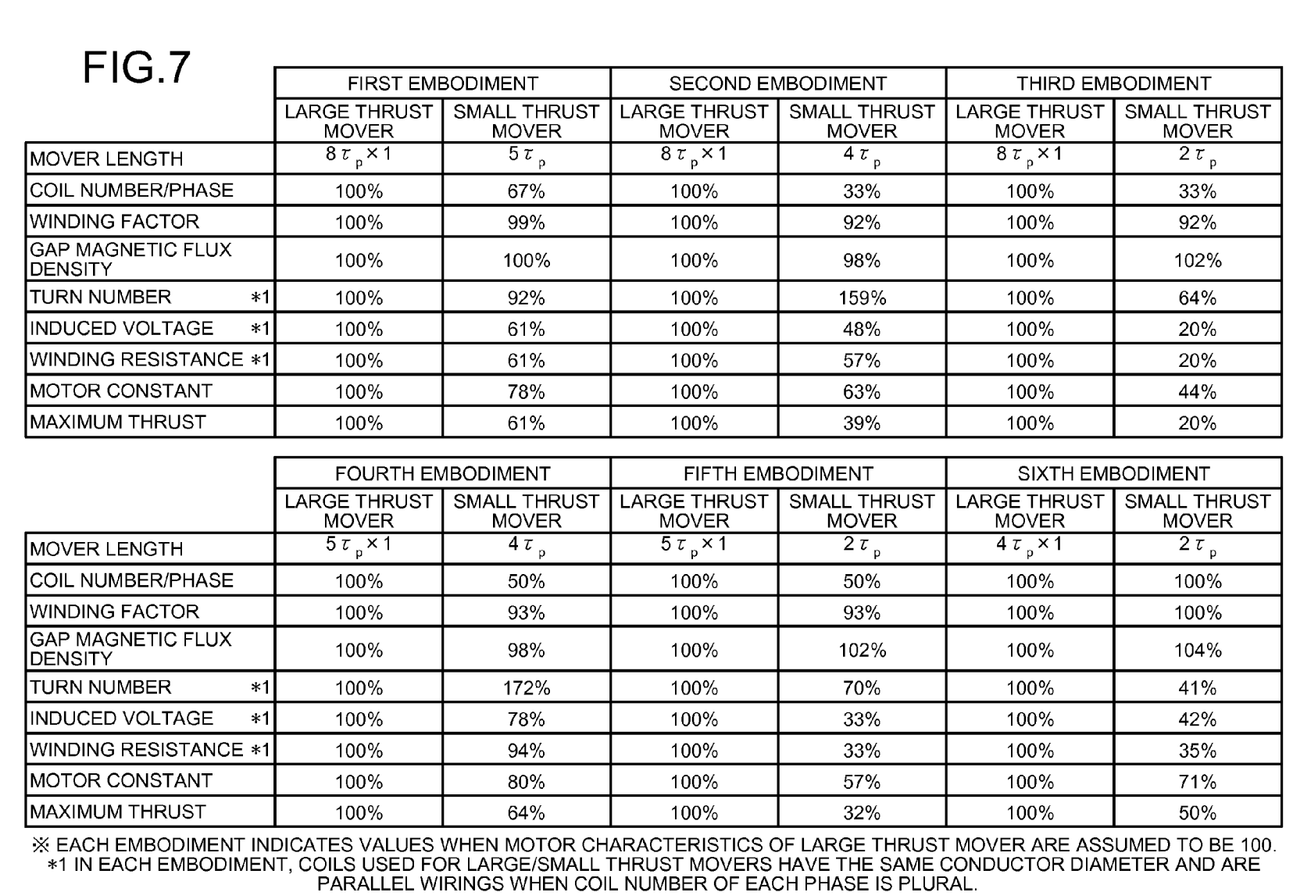
FIG. 7 is a comparison table of motor characteristics of each mover on which a work common to the first embodiment to the sixth embodiment is to be mounted and required necessary thrusts calculated based on the characteristics.

A concept of the necessary thrusts for the large thrust mover and the small thrust mover of a linear slider in the first embodiment whose mover builds are different from each other is described below based on FIG. 7. FIG. 7 is a comparison table of motor characteristics of each mover on which a work common to the present embodiment is to be mounted and required necessary thrusts calculated based on the characteristics.

Generally, when the sizes of the works (loads) to be mounted on movers are different from each other depending on the application of the linear slider, difference occurs in the necessary thrusts required for the movers on which the works are to be mounted.

In other words, in the first embodiment, the necessary thrusts differ between works to be mounted on the large thrust mover 1c and the small thrust mover 1d illustrated in FIGS. 1A and 1B. In this case, in the first embodiment, the relationship between the magnetic pole number P of the permanent magnet fields and the armature coil number M of the large thrust mover 1c and the small thrust mover 1d that are arranged above a single stator is determined at P:M=8:9 and P:M=5:6, respectively. In the first embodiment, the lengths of the large thrust mover 1c and the small thrust mover 1d are changed to 8τp×N (N is an integer of equal to or larger than 1) and 5τp×N (N is an integer of equal to or larger than 1), respectively. As a result of this, the coil number per one phase (the ratio is 100%/67%), the winding factor (the ratio is 100%/99%), the gap magnetic flux density (the ratio is 100%/100%), and the turn number of windings (the ratio is 100%/92%), all of which are of the armature coil of each mover, are different. Accordingly, the induced voltage constant (the ratio of the thrust constant is 100%/61%) is different. Subsequently, the winding space of the armature coil of each mover is different. Therefore, the winding resistance (the ratio is 100%/61%) is different, and when the induced voltage constant and the winding resistance of each mover are different, the motor constant (the ratio is 100%/78%) is different. Consequently, necessary thrusts (the ratio is 100%/61%) for the both can be obtained by calculating the ratio of the thrusts of the movers using the duplicate ratio of the motor constant of each mover. As a result, the lengths of the movers having builds of the large thrust mover and the small thrust mover can be appropriately designed to optimal dimensions depending on the size (difference between necessary thrusts required for each mover) of the work (load) to be mounted on each mover.

Accordingly, in the first embodiment as described above, a plurality of large thrust movers and small thrust movers that have different combinations of the magnetic pole number and the coil number are arranged above a single stator, and therefore, the motor build can be maximally downsized even when there is large difference in necessary thrusts for a plurality of works.

A second embodiment will be described below.

Figure 2A:
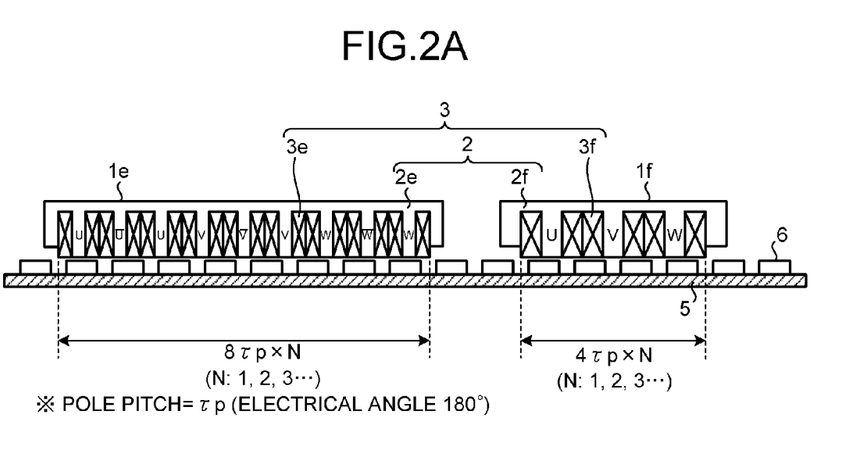
FIG. 2A is a side view of a multi-head linear motor with cores according to a second embodiment.
Figure 2B:
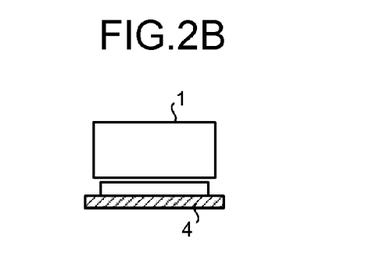
FIG. 2B is an elevation view of the multi-head linear motor with cores illustrated in FIG. 2A.

FIG. 2A is a side view of a multi-head linear motor with cores according to the second embodiment. FIG. 2B is an elevation view of the multi-head linear motor with cores illustrated in FIG. 2A.

In FIGS. 2A and 2B, 1e denotes a large thrust mover, 1f denotes a small thrust mover, 2e denotes a large thrust core, 2f denotes a small thrust core, 3e denotes a large thrust coil, and 3f denotes a small thrust coil.

The difference between the second embodiment and the first embodiment is in that, as illustrated in FIGS. 2A and 2B, the large thrust mover 1e has a combination of the magnetic pole number of the permanent magnet fields P=8 and the armature coil number M=9, and the length of the mover is 8τp×N (N: 1, 2, 3, and so on) when the pole pitch is indicated by τp. In contrast, the small thrust mover 1f has a combination of the magnetic pole number of the permanent magnet fields P=4 and the armature coil number M=3, and the length of the mover is 4τp×N (N: 1, 2, 3, and so on).

In the second embodiment, a concept of the necessary thrusts for the large thrust mover and the small thrust mover of a linear slider whose mover builds are different from each other is described below based on FIG. 7.

In other words, in the second embodiment, the necessary thrusts largely differ between works to be mounted on the large thrust mover 1e and the small thrust mover 1f illustrated in FIGS. 2A and 2B. In this case, in the second embodiment, the relationship between the magnetic pole number P of the permanent magnet fields and the armature coil number M of the large thrust mover 1e and the small thrust mover 1f that are arranged above a single stator is determined at P:M=8:9 and P:M=4:3, respectively. In the second embodiment, the lengths of the large thrust mover 1e and the small thrust mover 1f are changed to 8τp×N (N is an integer of equal to or larger than 1) and 4τp×N (N is an integer of equal to or larger than 1), respectively. As a result of this, the coil number per one phase (the ratio is 100%/33%), the winding factor (the ratio is 100%/92%), the gap magnetic flux density (the ratio is 100%/98%), and the turn number of windings (the ratio is 100%/159%), all of which are of the armature coil of each mover, are different. Accordingly, the induced voltage constant (the ratio of the thrust constant is 100%/48%) is different. Subsequently, the winding space of the armature coil of each mover is different. Therefore, the winding resistance (the ratio is 100%/57%) is different, and when the induced voltage constant and the winding resistance of each mover are different, the motor constant (the ratio is 100%/63%) is different. Consequently, necessary thrusts (the ratio is 100%/39%) for the both can be obtained by calculating the ratio of the thrusts of the movers using the duplicate ratio of the motor constant of each mover. As a result, the lengths of the movers having builds of the large thrust mover and the small thrust mover can be appropriately designed to optimal dimensions depending on the size (difference between necessary thrusts required for each mover) of the work (load) to be mounted on each mover.

Accordingly, in the second embodiment as described above, a plurality of large thrust movers and small thrust movers that have different combinations of the magnetic pole number and the coil number are arranged above a single stator, and therefore, the motor build can be downsized even when there is large difference in necessary thrusts for a plurality of works.

A third embodiment will be described below.

Figure 3A:
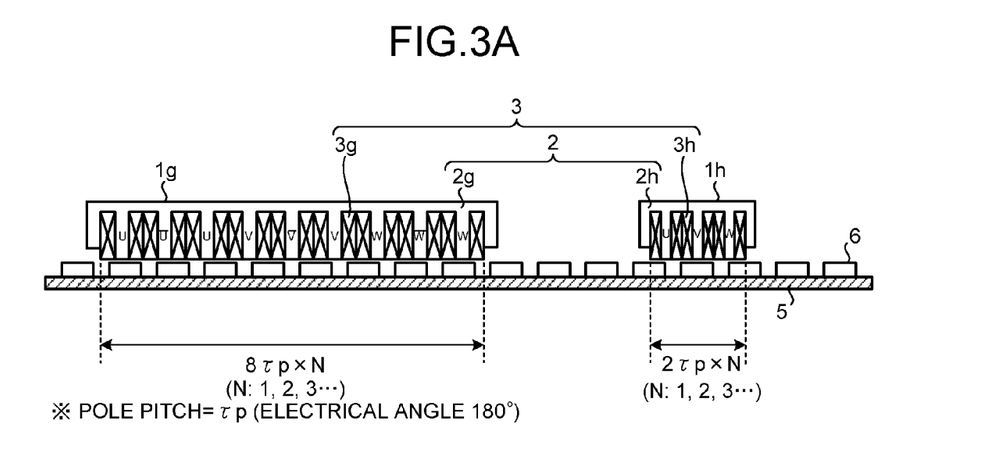
FIG. 3A is a side view of a multi-head linear motor with cores according to a third embodiment.
Figure 3B:
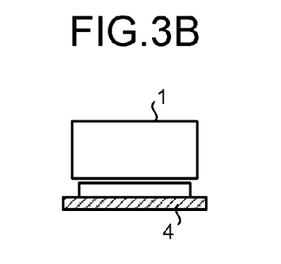
FIG. 3B is an elevation view of the multi-head linear motor with cores illustrated in FIG. 3A.

FIG. 3A is a side view of a multi-head linear motor with cores according to the third embodiment. FIG. 3B is an elevation view of the multi-head linear motor with cores illustrated in FIG. 3A.

In FIGS. 3A and 3B, 1g denotes a large thrust mover, 1h denotes a small thrust mover, 2g denotes a large thrust core, 2h denotes a small thrust core, 3g denotes a large thrust coil, and 3h denotes a small thrust coil.

The difference between the third embodiment and the second embodiment is in that, as illustrated in FIGS. 3A and 3B, the large thrust mover 1g has a combination of the magnetic pole number of the permanent magnet fields P=8 and the armature coil number M=9, and the length of the mover is 8τp×N (N: 1, 2, 3, and so on) when the pole pitch is indicated by τp. In contrast, the small thrust mover 1h has a combination of the magnetic pole number of the permanent magnet fields P=2 and the armature coil number M=3, and the length of the mover is 2τp×N (N: 1, 2, 3, and so on).

In the third embodiment, a concept of the necessary thrusts for the large thrust mover and the small thrust mover of a linear slider whose mover builds are different from each other is described below based on FIG. 7.

In other words, in the third embodiment, the necessary thrusts differ between works to be mounted on the large thrust mover 1g and the small thrust mover 1h illustrated in FIGS. 3A and 3B. In this case, in the third embodiment, the relationship between the magnetic pole number P of the permanent magnet fields and the armature coil number M of the large thrust mover 1g and the small thrust mover 1h that are arranged above a single stator is determined at P:M=8:9 and P:M=2:3, respectively. In the third embodiment, the lengths of the large thrust mover 1g and the small thrust mover 1h are changed to 8τp×N (N is an integer of equal to or larger than 1) and 2τp×N (N is an integer of equal to or larger than 1), respectively. As a result of this, the coil number per one phase (the ratio is 100%/33%), the winding factor (the ratio is 100%/92%), the gap magnetic flux density (the ratio is 100%/102%), and the turn number of windings (the ratio is 100%/64%), all of which are of the armature coil of each mover, are different. Accordingly, the induced voltage constant (the ratio of the thrust constant is 100%/20%) is different. The winding space of the armature coil of each mover is different, and therefore, the winding resistance (the ratio is 100%/20%) is different. Moreover, when the induced voltage constant and the winding resistance of each mover are different, the motor constant (the ratio is 100%/44%) is different. Consequently, necessary thrusts (the ratio is 100%/20%) for the both can be obtained by calculating the ratio of the thrusts of the movers using the duplicate ratio of the motor constant of each mover. As a result, the lengths of the movers having builds of the large thrust mover and the small thrust mover can be appropriately designed to optimal dimensions depending on the size (difference between necessary thrusts required for each mover) of the work (load) to be mounted on each mover.

Accordingly, in the third embodiment as described above, a plurality of large thrust movers and small thrust movers that have different combinations of the magnetic pole number and the coil number are arranged above a single stator, and therefore, the motor build can be downsized even when there is large difference in necessary thrusts for a plurality of works.

A fourth embodiment will be described below.

Figure 4A:
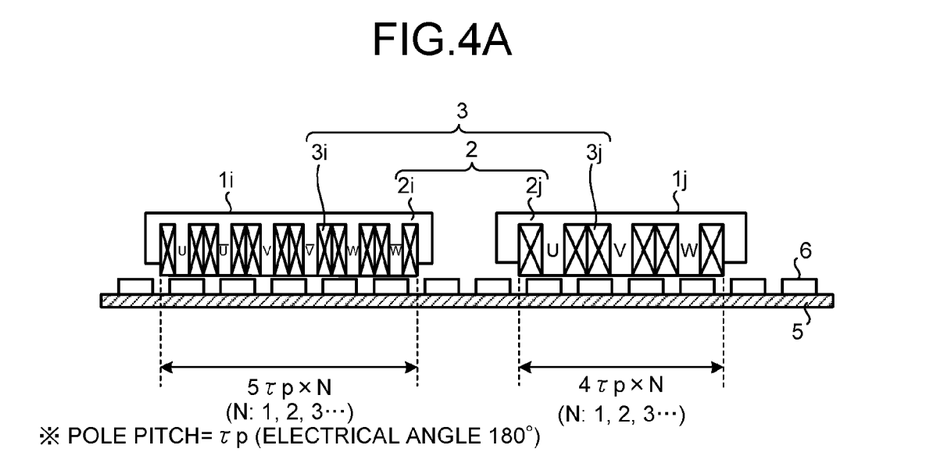
FIG. 4A is a side view of a multi-head linear motor with cores according to a fourth embodiment.
Figure 4B:
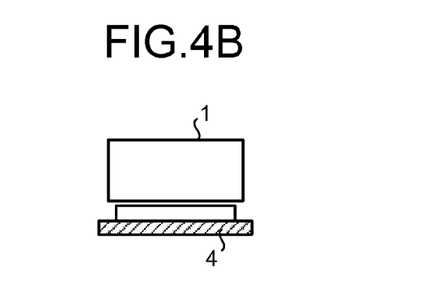
FIG. 4B is an elevation view of the multi-head linear motor with cores illustrated in FIG. 4A.

FIG. 4A is a side view of a multi-head linear motor with cores according to the fourth embodiment. FIG. 4B is an elevation view of the multi-head linear motor with cores illustrated in FIG. 4A.

In FIGS. 4A and 4B, 1i denotes a large thrust mover, 1j denotes a small thrust mover, 2i denotes a large thrust core, 2j denotes a small thrust core, 3i denotes a large thrust coil, and 3j denotes a small thrust coil.

The difference between the fourth embodiment and the third embodiment is in that, as illustrated in FIGS. 4A and 4B, the large thrust mover 1i has a combination of the magnetic pole number of the permanent magnet fields P=5 and the armature coil number M=3, and the length of the mover is 5τp×N (N: 1, 2, 3, and so on) when the pole pitch is indicated by τp. In contrast, the small thrust mover 1j has a combination of the magnetic pole number of the permanent magnet fields P=4 and the armature coil number M=6, and the length of the mover is 4τp×N (N: 1, 2, 3, and so on).

In the fourth embodiment, a concept of the necessary thrusts for the large thrust mover and the small thrust mover of a linear slider whose mover builds are different from each other is described below based on FIG. 7.

In other words, in the fourth embodiment, the necessary thrusts largely differ between works to be mounted on the large thrust mover 1i and the small thrust mover 1j illustrated in FIGS. 4A and 4B. In this case, in the fourth embodiment, the relationship between the magnetic pole number P of the permanent magnet fields and the armature coil number M of the large thrust mover 1i and the small thrust mover 1j that are arranged above a single stator is determined at P:M=5:6 and P:M=4:3, respectively. In the fourth embodiment, the lengths of the large thrust mover 1i and the small thrust mover 1j are changed to 5τp×N (N is an integer of equal to or larger than 1) and 4τp×N (N is an integer of equal to or larger than 1), respectively. As a result of this, the coil number per one phase (the ratio is 100%/50%), the winding factor (the ratio is 100%/93%), the gap magnetic flux density (the ratio is 100%/98%), and the turn number of windings (the ratio is 100%/172%), all of which are of the armature coil of each mover, are different. Accordingly, the induced voltage constant (the ratio of the thrust constant is 100%/78%) is different. Subsequently, the winding space of the armature coil of each mover is different. Therefore, the winding resistance (the ratio is 100%/94%) is different, and when the induced voltage constant and the winding resistance of each mover are different, the motor constant (the ratio is 100%/80%) is different. Consequently, necessary thrusts (the ratio is 100%/64%) for the both can be obtained by calculating the ratio of the thrusts of the movers using the duplicate ratio of the motor constant of each mover. As a result, the lengths of the movers having builds of the large thrust mover and the small thrust mover can be appropriately designed to optimal dimensions depending on the size (difference between necessary thrusts required for each mover) of the work (load) to be mounted on each mover.

Accordingly, in the fourth embodiment as described above, a plurality of large thrust movers and small thrust movers that have different combinations of the magnetic pole number and the coil number are arranged above a single stator, and therefore, the motor build can be downsized even when there is large difference in necessary thrusts for a plurality of works.

A fifth embodiment will be described below.

Figure 5A:
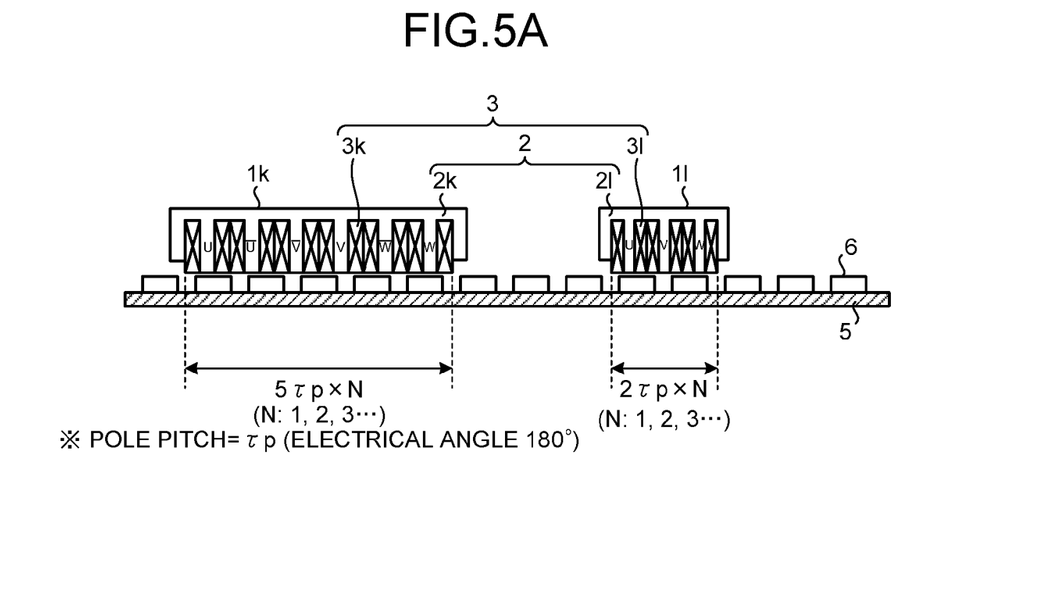
FIG. 5A is a side view of a multi-head linear motor with cores according to a fifth embodiment.
Figure 5B:
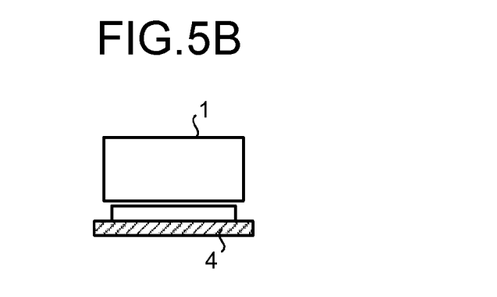
FIG. 5B is an elevation view of the multi-head linear motor with cores illustrated in FIG. 5A.

FIG. 5A is a side view of a multi-head linear motor with cores according to the fifth embodiment. FIG. 5B is an elevation view of the multi-head linear motor with cores illustrated in FIG. 5A.

In FIGS. 5A and 5B, 1k denotes a large thrust mover, 1h denotes a small thrust mover, 2k denotes a large thrust core, 2l denotes a small thrust core, 3k denotes a large thrust coil, and 3l denotes a small thrust coil.

The difference between the fifth embodiment and the fourth embodiment is in that, as illustrated in FIGS. 5A and 5B, the large thrust mover 1k has a combination of the magnetic pole number of the permanent magnet fields P=5 and the armature coil number M=6, and the length of the mover is 5τp×N (N: 1, 2, 3, and so on) when the pole pitch is indicated by τp. In contrast, the small thrust mover 1l has a combination of the magnetic pole number of the permanent magnet fields P=2 and the armature coil number M=3, and the length of the mover is 2τp×N (N: 1, 2, 3, and so on).

In the fifth embodiment, a concept of the necessary thrusts for the large thrust mover and the small thrust mover of a linear slider whose mover builds are different from each other is described below based on FIG. 7.

In other words, in the fifth embodiment, the necessary thrusts largely differ between works to be mounted on the large thrust mover 1k and the small thrust mover 1l illustrated in FIGS. 5A and 5B. In this case, in the fifth embodiment, the relationship between the magnetic pole number P of the permanent magnet fields and the armature coil number M of the large thrust mover 1k and the small thrust mover 1l that are arranged above a single stator is determined at P:M=5:6 and P:M=2:3, respectively. In the fifth embodiment, the lengths of the large thrust mover 1k and the small thrust mover 1l are changed to 5τp×N (N is an integer of equal to or larger than 1) and 2τp×N (N is an integer of equal to or larger than 1), respectively. As a result of this, the coil number per one phase (the ratio is 100%/50%), the winding factor (the ratio is 100%/93%), the gap magnetic flux density (the ratio is 100%/102%), and the turn number of windings (the ratio is 100%/70%), all of which are of the armature coil of each mover, are different. Accordingly, the induced voltage constant (the ratio of the thrust constant is 100%/33%) is different. The winding space of the armature coil of each mover is different, and therefore, the winding resistance (the ratio is 100%/33%) is different. Moreover, when the induced voltage constant and the winding resistance of each mover are different, the motor constant (the ratio is 100%/57%) is different. Consequently, necessary thrusts (the ratio is 100%/32%) for the both can be obtained by calculating the ratio of the thrusts of the movers using the duplicate ratio of the motor constant of each mover. As a result, the lengths of the movers having builds of the large thrust mover and the small thrust mover can be appropriately designed to optimal dimensions depending on the size (difference between necessary thrusts required for each mover) of the work (load) to be mounted on each mover.

Accordingly, in the fifth embodiment as described above, a plurality of large thrust movers and small thrust movers that have different combinations of the magnetic pole number and the coil number are arranged above a single stator, and therefore, the motor build can be downsized even when there is large difference in necessary thrusts for a plurality of works.

A sixth embodiment will be described.

Figure 6A:
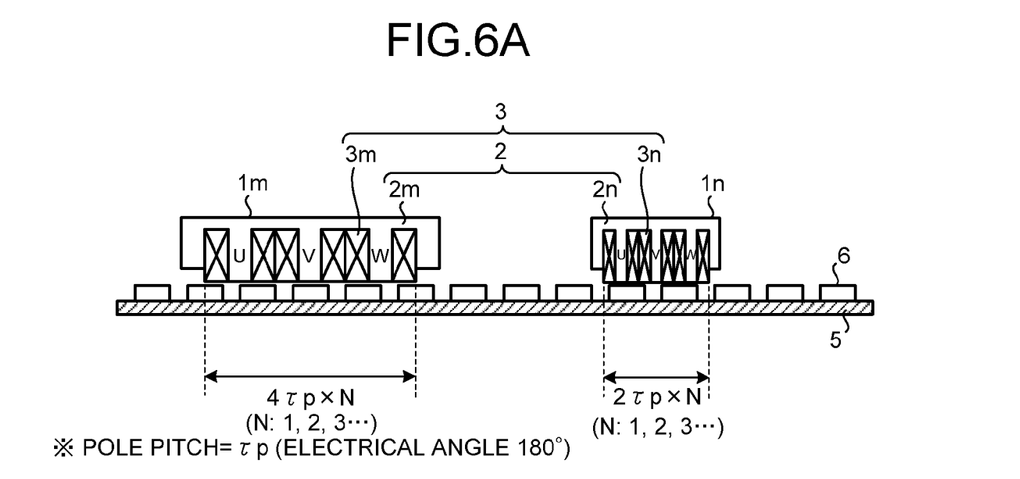
FIG. 6A is a side view of a multi-head linear motor with cores according to a sixth embodiment.
Figure 6B:
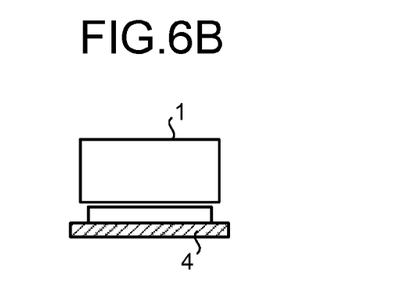
FIG. 6B is an elevation view of the multi-head linear motor with cores illustrated in FIG. 6A.

FIG. 6A is a side view of a multi-head linear motor with cores according to the sixth embodiment. FIG. 6B is an elevation view of the multi-head linear motor with cores illustrated in FIG. 6A.

In FIGS. 6A and 6B, 1m denotes a large thrust mover, 1n denotes a small thrust mover, 2m denotes a large thrust core, 2n denotes a small thrust core, 3m denotes a large thrust coil, and 3n denotes a small thrust coil.

The difference between the sixth embodiment and the fifth embodiment is in that, as illustrated in FIGS. 6A and 6B, the large thrust mover 1m has a combination of the magnetic pole number of the permanent magnet fields P=4 and the armature coil number M=3, and the length of the mover is 4τp×N (N: 1, 2, 3, and so on) when the pole pitch is indicated by τp. In contrast, the small thrust mover 1n has a combination of the magnetic pole number of the permanent magnet fields P=2 and the armature coil number M=3, and the length of the mover is 2τp×N (N: 1, 2, 3, and so on).

In the sixth embodiment, a concept of the necessary thrusts for the large thrust mover and the small thrust mover of a linear slider whose mover builds are different from each other is described below based on FIG. 7.

In other words, in the sixth embodiment, the necessary thrusts largely differ between works to be mounted on the large thrust mover 1m and the small thrust mover 1n illustrated in FIGS. 6A and 6B. In this case, in the sixth embodiment, the relationship between the magnetic pole number P of the permanent magnet fields and the armature coil number M of the large thrust mover 1m and the small thrust mover 1n that are arranged above a single stator is determined at P:M=4:3 and P:M=2:3, respectively. In the sixth embodiment, the lengths of the large thrust mover 1m and the small thrust mover 1n are changed to 4τp×N (N is an integer of equal to or larger than 1) and 2τp×N (N is an integer of equal to or larger than 1), respectively. As a result of this, the coil number per one phase (the ratio is 100%/100%), the winding factor (the ratio is 100%/100%), the gap magnetic flux density (the ratio is 100%/104%), and the turn number of windings (the ratio is 100%/41%), all of which are of the armature coil of each mover, are different. Accordingly, the induced voltage constant (the ratio of the thrust constant is 100%/42%) is different. The winding space of the armature coil of each mover is different, and therefore, the winding resistance (the ratio is 100%/35%) is different. Moreover, when the induced voltage constant and the winding resistance of each mover are different, the motor constant (the ratio is 100%/71%) is different. Consequently, necessary thrusts (the ratio is 100%/50%) for the both can be obtained by calculating the ratio of the thrusts of the movers using the duplicate ratio of the motor constant of each mover. As a result, the lengths of the movers having builds of the large thrust mover and the small thrust mover can be appropriately designed to optimal dimensions depending on the size (difference between necessary thrusts required for each mover) of the work (load) to be mounted on each mover.

Accordingly, in the sixth embodiment as described above, a plurality of large thrust movers and small thrust movers that have different combinations of the magnetic pole number and the coil number are arranged above a single stator, and therefore, the motor build can be downsized even when there is large difference in necessary thrusts for a plurality of works.

A motor build appropriate to each work is applicable even to a plurality of works requiring each different necessary thrust by arranging above a single stator, a plurality of movers having different combinations of the magnetic pole number of the permanent magnet fields and the armature coil number. Therefore, the multi-head linear motors with cores of the embodiments described above are applicable to wide variety of applications, for example, liquid crystal manufacturing equipment in which the large thrust mover carries main works such as glass substrates and the small thrust mover carries small works such as cables.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multi-head linear motor with cores comprising:
   a permanent magnet field including P pieces of permanent magnets arrayed in a linear direction so as to alternately have different magnetic poles; and
   an armature that is arranged so as to face the permanent magnet field through a magnetic air gap and that includes M pieces of armature coils collectively wound around an armature core and being in three-phase connection, wherein
   any one of the armature and the permanent magnet field constitutes a mover, the other constitutes a stator, the mover is arranged in plurality to be lined up over a single piece of the stator, and the movers are individually driven relative to the stator,
   the movers each include a large thrust mover and a small thrust mover that have different relationships each determined with a magnetic pole number P of the permanent magnets and a number M of the armature coils relative to the stator, and
   each of lengths of the large and small thrust movers is determined based on the magnetic pole number P of the corresponding permanent magnets.

2. The multi-head linear motor with cores according to claim 1, wherein
   the large thrust mover has a relationship between the magnetic pole number P of the permanent magnets and the number M of the armature coils of 8N:9N (where N is an integer of equal to or larger than 1), and a length of the large thrust mover is $8\tau p \times N$ (N is an integer of equal to or larger than 1) when a pole pitch is indicated by $\tau p$, and
   the small thrust mover has a relationship between the magnetic pole number P of the permanent magnets and the number M of the armature coils of 5N:6N (where N is an integer of equal to or larger than 1), and a length of the small thrust mover is $5\tau p \times N$ (N is an integer of equal to or larger than 1).

3. The multi-head linear motor with cores according to claim 1, wherein
   the large thrust mover has a relationship between the magnetic pole number P of the permanent magnets and the number M of the armature coils of 8N:9N (where N is an integer of equal to or larger than 1), and a length of the large thrust mover is $8\tau p \times N$ (N is an integer of equal to or larger than 1) when a pole pitch is indicated by $\tau p$, and
   the small thrust mover has a relationship between the magnetic pole number P of the permanent magnets and the number M of the armature coils of 4N:3N (where N is an integer of equal to or larger than 1), and a length of the small thrust mover is $4\tau p \times N$ (N is an integer of equal to or larger than 1).

4. The multi-head linear motor with cores according to claim 1, wherein
   the large thrust mover has a relationship between the magnetic pole number P of the permanent magnets and the number M of the armature coils of 8N:9N (where N is an integer of equal to or larger than 1), and a length of the large thrust mover is $8\tau p \times N$ (N is an integer of equal to or larger than 1) when a pole pitch is indicated by $\tau p$, and
   the small thrust mover has a relationship between the magnetic pole number P of the permanent magnets and the number M of the armature coils of 2N:3N (where N is an integer of equal to or larger than 1), and a length of the small thrust mover is $2\tau p \times N$ (N is an integer of equal to or larger than 1).

5. The multi-head linear motor with cores according to claim 1, wherein
   the large thrust mover has a relationship between the magnetic pole number P of the permanent magnets and the number M of the armature coils of 5N:6N (where N is an integer of equal to or larger than 1), and a length of the large thrust mover is $5\tau p \times N$ (N is an integer of equal to or larger than 1) when a pole pitch is indicated by $\tau p$, and
   the small thrust mover has a relationship between the magnetic pole number P of the permanent magnets and the number M of the armature coils of 4N:3N (where N is an integer of equal to or larger than 1), and a length of the small thrust mover is $4\tau p \times N$ (N is an integer of equal to or larger than 1).

6. The multi-head linear motor with cores according to claim 1, wherein
   the large thrust mover has a relationship between the magnetic pole number P of the permanent magnets and the number M of the armature coils of 5N:6N (where N is an integer of equal to or larger than 1), and a length of the large thrust mover is $5\tau p \times N$ (N is an integer of equal to or larger than 1) when a pole pitch is indicated by $\tau p$, and
   the small thrust mover has a relationship between the magnetic pole number P of the permanent magnets and the number M of the armature coils of 2N:3N (where N is an integer of equal to or larger than 1), and a length of the small thrust mover is $2\tau p \times N$ (N is an integer of equal to or larger than 1).

7. The multi-head linear motor with cores according to claim 1, wherein
   the large thrust mover has a relationship between the magnetic pole number P of the permanent magnets and the number M of the armature coils of 4N:3N (where N is an integer of equal to or larger than 1), and a length of the large thrust mover is $4\tau p \times N$ (N is an integer of equal to or larger than 1) when a pole pitch is indicated by $\tau p$, and
   the small thrust mover has a relationship between the magnetic pole number P of the permanent magnets and the number M of the armature coils of 2N:3N (where N is an integer of equal to or larger than 1), and a length of the small thrust mover is $2\tau p \times N$ (N is an integer of equal to or larger than 1).

* * * * *